F. F. ALEXANDRE.
BUMPER FOR AUTOMOBILES.
APPLICATION FILED MAR. 30, 1922.
1,436,559.
Patented Nov. 21, 1922.
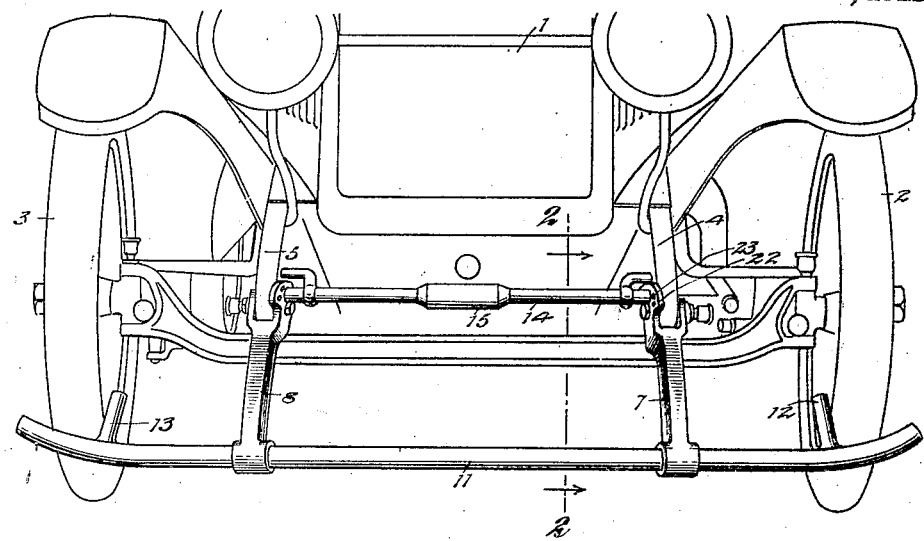
Fig. 1.
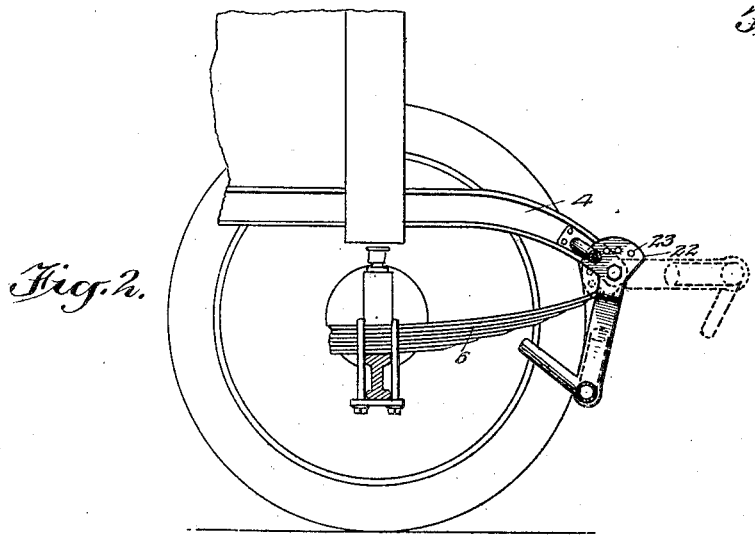
Fig. 2.
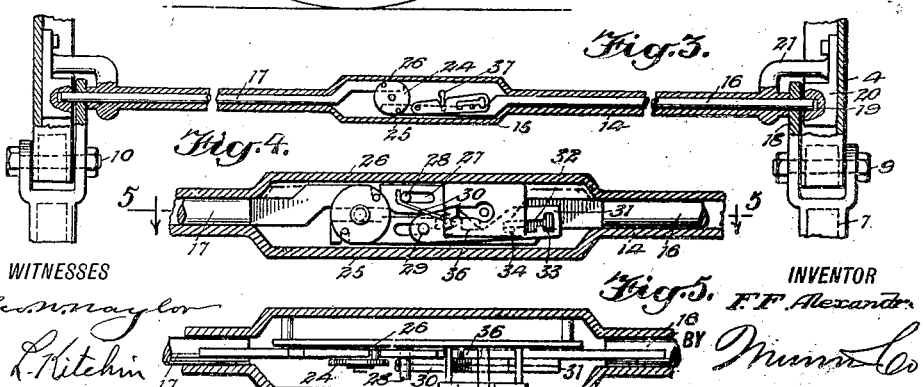
WITNESSES
INVENTOR
F. F. Alexandre
BY
ATTORNEYS Patented Nov. 21, 1922.

1,436,559

UNITED STATES PATENT OFFICE.

FREDERICK FRANCIS ALEXANDRE, OF CEDARHURST, NEW YORK.

BUMPER FOR AUTOMOBILES.

Application filed March 30, 1922. Serial No. 547,977.

*To all whom it may concern:*

Be it known that I, FREDERICK F. ALEXANDRE, a citizen of the United States and a resident of Cedarhurst, in the county of Nassau and State of New York, have invented a new and improved Bumper for Automobiles, of which the following is a full, clear, and exact description.

This invention relates to bumpers and locks for automobiles and particularly to an improved construction wherein the parts may be adjusted to act solely as a bumper or may be adjusted to act principally as a lock for preventing theft.

The object of the invention is to provide a practical construction of bumper wherein features are presented which will co-act with locking means for locking the bumper in different adjusted positions.

Another object of the invention is to provide a construction of bumper and lock wherein the bumper may be swung to an elevated position and act as a bumper or swing to a lowered position to interlock with the front wheels of an automobile to act as a locking means for the automobile.

A still further object of the invention is to provide a vertical swinging bumper with wheel interlocking ends and a locking mechanism for locking the bumper against movement when swung to a position in engagement with the front wheels of an automobile.

In the accompanying drawing—

Figure 1 is a front view of an automobile, partly in perspective, showing a combined lock and bumper disclosing one embodiment of the invention.

Figure 2 is a fragmentary sectional view through Figure 1 approximately on line 2—2.

Figure 3 is a fragmentary top plan view of the locking means and associated parts shown in Figure 1, certain parts being broken away for illustrating the operation and certain of the locking mechanism.

Figure 4 is an enlarged detail sectional view showing the locking mechanism illustrated in Figure 3.

Figure 5 is a sectional view through Figure 4 on line 5—5.

Referring to the accompanying drawing by numerals, 1 indicates an automobile of any desired kind and 2 and 3 the front wheels thereof. The automobile is provided with any usual or preferred form of chassis having side bars 4 and 5, the front ends of which are mounted on the respective springs 6. Pivotally mounted on these bars are arms 7 and 8, said arms being bifurcated so as to straddle the bars 4 and 5 and accommodate the pivotal bolts 9 and 10. The forward ends of the bars 7 and 8 are rigidly secured to a transverse guide bar 11 which may be of any desired length, preferably long enough to extend slightly beyond the edges of the wheels 2 and 3 when the automobile is moving straight to the front. When the bar 11 and associated parts are acting as a bumper, they are arranged as shown in dotted lines in Figure 2. When arranged to act as part of a locking mechanism for preventing steering or lateral turning of the wheels 2 and 3, the parts are moved downwardly as shown in Figure 1 so that the bar 11 may rest against the wheels 2 and 3 and the lugs 12 and 13 may engage or be positioned near the inner edge of each of the wheels.

By reason of this construction and arrangement, the wheels cannot be shifted laterally for turning and as it is imposible to move an automobile very far in a perfectly straight line it will, therefore, be impossible to steal the automobile unless it is put on a truck or other conveyance. In order that the bar 11 and associated parts may be locked in their lowered position as shown in Figures 1 and 2, a special locking mechanism is provided which includes a hollow bar 14 having an enlargement 15 at the center for receiving certain locking mechanism.

As shown in Figure 3, the hollow bar 14 guides the locking bars or bolts 16 and 17 which are designed to be projected or slid through the respective arms 18 of the bifurcated ends of the arms 7 and 8 and into suitable sockets 19 in the respective lugs 20, bolted or rigidly secured to the respective bars 4 and 5. In connection with the blocks 20 it will be noted that they are provided with integral extensions 21 which are also integral with the hollow bar 14. If desired, they could be made separate and rigidly secured to said hollow bar but the connection must be rigid in order that the hollow bar may be held rigidly in a given position to properly co-act with the bolts 16 and 17 and the locking mechanism arranged in the enlargement 15. The locking structure arranged in the enlargement 15 may be of any suitable kind provided the same will operate to move the bolts 16 and 17 back and forth to cause them to move into the sockets 19 or out of said sockets and out of the arms 18.

The arms 18 are each provided with an arc-shaped enlargement 22 having a number of apertures 23 through which the bolts may be projected to lock the bar 11 either in a lowered or raised position. The locking mechanism in the enlargement 15 is provided with a disk 24 pivotally mounted on the enlargement 15 and provided with pins 25 and 26 extending into suitable notches in the ends of the bars 16 and 17 so that both of the bolts or bars 16 and 17 will move together.

As indicated in Figure 4, each of the bolts 16 and 17 is provided at its end with a slot 27 adapted to engage the pins 28 and 29 respectively. The pin 28 acts as a guide in slot 27 and in addition as an abutment for the spring 30 which spring acts on what may be termed a tumbler structure 31, which structure is provided with a slot 32 and notches 33 and 34 for receiving the pin 35 at different times, said pin projecting from the bolt 16. The bolt 16 is provided with a notch 36 designed to receive a key 37, said key acting to depress the tumbler structure 31 as it enters the notch 36 whereby the pin 35 is released or rather the tumbler structure is moved away from the pin and, consequently, the key may move the bolt 16 longitudinally which will result in the pin 35 sliding along the slot 32 to the other notch. In this way the bolts 16 and 17 are locked either in their outer or inner position.

In operation, after the device has been applied to the automobile and it is desired to lock the same, the locking mechanism in the enlargement 15 is operated for retracting the bolts 16 and 17 and then the bar 11 and associated parts are swung downwardly until the bar 11 strikes the wheels 2 and 3. The bolts 16 and 17 are then projected to the position shown in Figure 3 which action will lock the parts against further movement in any direction. When the bar 11 is raised, the lugs or projections 12 and 13 will be entirely out of the way of the wheels so that steering of the automobile may be performed in the usual manner.

What I claim is:—

1. In a device of the character described, a vertical swingable bumper bar having means at its ends to engage and prevent steering of the wheels of an automobile.

2. In a device of the character described, a combined bumper and thief lock for automobiles, comprising a bumping structure acting in the double capacity of a bumper when in its uppermost position and means for preventing steering of the automobile wheels when in its lowermost position and a mechanism for locking the bumping structure in either position.

3. In a device of the character described, a bumper bar, vertical swinging supporting means therefor, said bumper bar being provided with means engaging the wheels of an automobile for preventing steering thereof when the bar is in a lowered position, and means for locking the supporting means for the bar either in a lowered or elevated position.

4. In a combined bumper and thief lock for automobiles, a bumper bar having a projection thereon near each end, a pair of swinging supports for said bar whereby said bar may be swung down so that the bumper and the projections will engage the wheels of the automobile, said bumper bar extending across the front of the wheels and said projections being positioned to extend on one side but near the wheels, and means for locking the bumper bar in engagement with the wheels and in a position out of engagement with said wheels.

5. In a combined bumper and thief lock for automobiles, a bumper bar formed with means which will substantially straddle the front wheels of the automobile when the bumper bar is moved to a lowered position, a pair of supporting arms pivotally mounted on the automobile and rigidly connected with said bumper bar, and locking means co-acting with the automobile and said supporting arms for locking said arms in a lowered and elevated position.

6. In a combined bumper and thief lock for automobiles, a bumper bar provided with means adapted to substantially straddle the front wheels of the automobile when the bumper bar is in a lowered position, a pair of swinging arms connected with said bumper bar and pivotally mounted on said automobile, said arms having a plurality of apertures arranged therein at different points, a locking bolt for each of said arms, said locking bolt being adapted to be projected through the apertures in said arms for locking the arms either in a lowered or elevated position, and manually actuated locking means for shifting said bolts and locking the same in different positions.

7. In a combined bumper and thief lock for automobiles, a bumper bar provided with means substantially straddling the automobile front wheels when the bumper bar is in a lowered position, a pair of supporting arms pivotally mounted on the automobile and rigidly secured to said bumper bar, said arms and bumper bar being capable of a swinging movement in a vertical plane, a pair of locking bolts for locking said arms in a lowered or elevated position, a hollow stationary bar for guiding said bolts, and a manually actuated locking mechanism for shifting said bolts.

8. In a combined bumper and thief lock for automobiles, a bumper bar pivoted to the front end of the automobile and swingable vertically thereon and means rigid with said bumper and adjacent the ends thereof to engage the wheels of the automobile when swung in its lowermost position.

9. In combination with an automobile, a pivoted bumper provided adjacent its ends with projections extending substantially in line with the inner sides of the wheels, said projections preventing the steering of said wheels when the bumper is swung in a lower position.

10. In combination with an automobile, a bumper bar swingable in a vertical plane, said bar engaging the wheels of the automobile for preventing their steering when swung to a position lower than the normal position.

FREDERICK FRANCIS ALEXANDRE.